(No Model.) 2 Sheets—Sheet 1.

A. B. JAMISON.
SITZ BATH.

No. 485,943. Patented Nov. 8, 1892.

Witnesses:
Wm C. Dashiell
William O. Belt.

Inventor:
Alcinous B. Jamison.
By Edson Bro's
Att'ys (No Model.) 2 Sheets—Sheet 2.

A. B. JAMISON.
SITZ BATH.

No. 485,943. Patented Nov. 8, 1892.

Witnesses:
Wm C Dashiell
William O. Belt.

Inventor:
Alcinous B. Jamison
By Edson Bro's,
Att'ys.

UNITED STATES PATENT OFFICE.

ALCINOUS B. JAMISON, OF NEW YORK, N. Y.

SITZ-BATH.

SPECIFICATION forming part of Letters Patent No. 485,943, dated November 8, 1892.

Application filed April 9, 1892. Serial No. 428,508. (No model.)

*To all whom it may concern:*

Be it known that I, ALCINOUS B. JAMISON, a citizen of the United States, residing at New York, in the county of New York and State of New York, have invented certain new and useful Improvements in Sitz-Baths; and I do hereby declare the following to be a full, clear, and exact description of the invention, such as will enable others skilled in the art to which it appertains to make and use the same.

My invention relates to a combined shallow sitz-bath, douche, and bed-pan; and its object is to provide a simple and inexpensive device adapted for medicinal and general use and so arranged that the user will not be affected by sudden changes in the temperature of the bath as the water is admitted.

With these ends in view the invention comprises a suitable pan having an inlet and outlet pipe, the branches of said inlet-pipe extending partially around the pan, a seat having a depending annular flange which fits snugly within the pan and an inner wall which divides the pan into two compartments, and a removable plate adapted to be secured on the pan to cover a portion thereof and enable the same to be used as a douche-pan.

My invention further consists of certain details of construction and arrangement of parts, which will be hereinafter described and claimed.

I have illustrated the invention in the accompanying drawings, forming a part of this specification, and in which—

Figure 1:
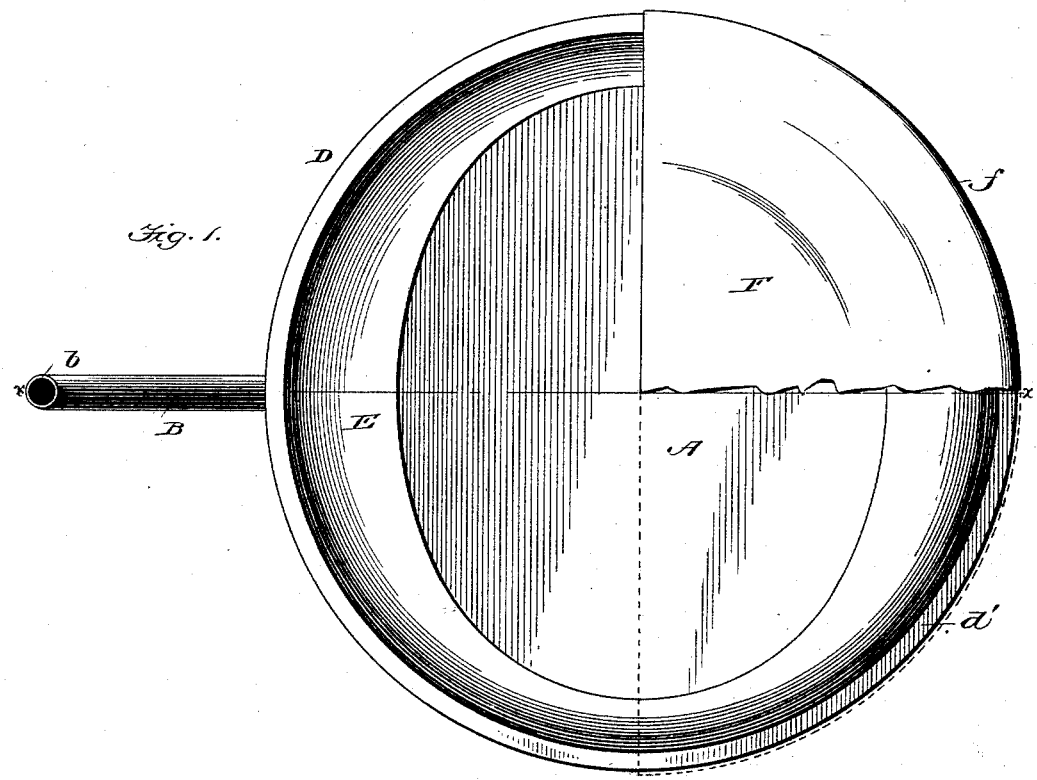
Figure 2:
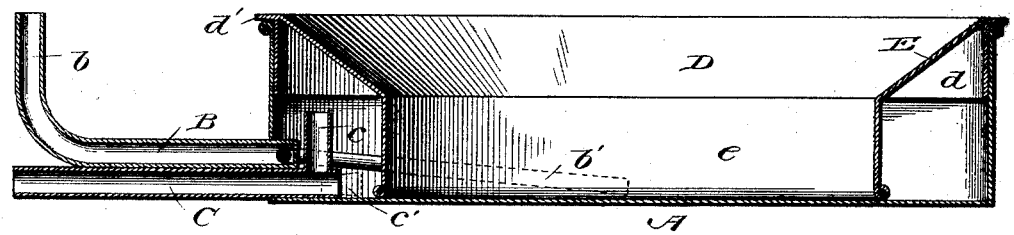
Figure 3:
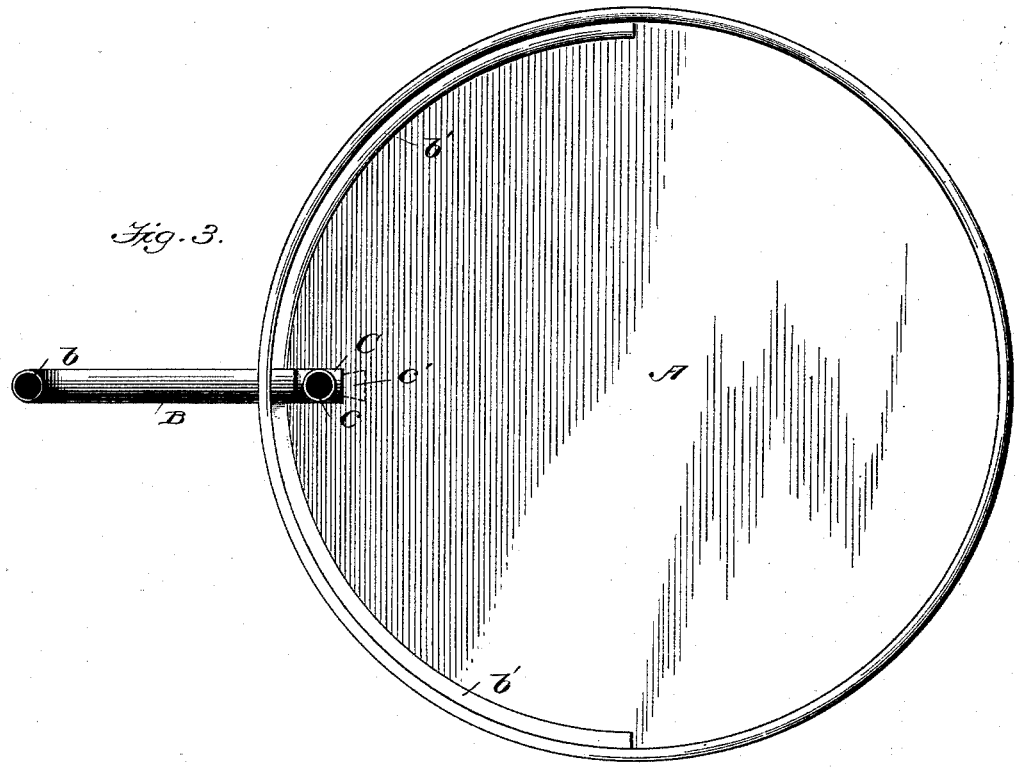
Figure 4:
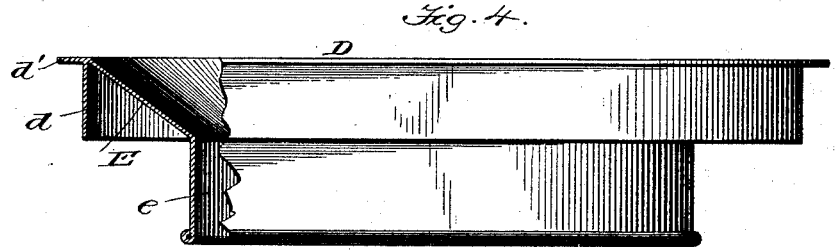
Figure 5:
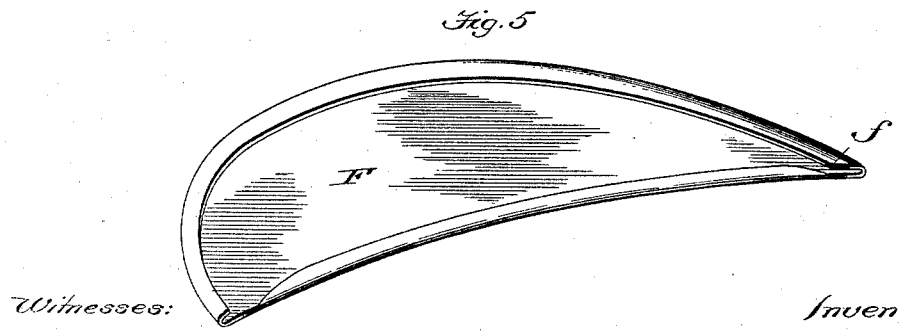

Figure 1 is a top plan view of my improved sitz-bath, showing the cover to adapt it for a douche, partly broken away. Fig. 2 is a vertical sectional view on the line *x x* of Fig. 1. Fig. 3 is a plan view looking upon the pan with the seat removed. Fig. 4 is a view of the seat removed from the pan, partly in section; and Fig. 5 is a perspective view of the cover for the douche shown in an inverted position.

Referring to the drawings, in which like letters of reference denote corresponding parts in all the figures, A designates the pan of my improved sitz-bath, which is preferably constructed of suitable water-tight material in circular form, and this pan is comparatively shallow, so that a great amount of water will be unnecessary. An inlet-pipe B, having an upturned outer end *b*, is arranged in one side of the pan, and it projects a short distance through the side within the pan. This inlet-pipe has two branch pipes *b'* on opposite sides thereof, which extend about halfway around the pan, said branches lying close to the side of the pan and may be secured in place in any suitable manner. By this arrangement of the branched inlet-pipe it will be easily seen that the sitz-bath is readily adapted for the use of water in all forms of anal and rectal diseases particularly, as the bather may continue to add hot water without moving from the bath, which water is prevented from coming directly into contact with the body before it has intermingled with the water already in the pan. The hot water is conveyed by the branch pipes *b'* on opposite sides of the pan, and it mingles with the water between the pan and the inner wall of the seat before coming in contact with the bather's body, which thereby prevents the bather from chills, &c., occasioned by sudden changes in the temperature of the water. An outlet or overflow pipe C is arranged, preferably, just below the inlet-pipe and close to the bottom of the pan, the inner end thereof projecting through the side of the pan into the same, so that the water may be readily withdrawn and conveyed to a suitable place by a rubber tube fitted over the outer end of said pipe. Just in rear of the inner end of the inlet-pipe is a vertical extension *c*, which may come close to the top of the pan, and the inner end of the horizontal outlet-pipe C is normally closed by a stopper *c'*, as the extension *c* is sufficient to receive all the overflow from the pan, and it is only necessary to remove the stopper *c'* when it is desired to empty the pan. The inlet and outlet pipes are arranged, as shown in the drawings, for simplicity and compactness; but their relative positions may be changed as desired. It will be observed, however, that the inlet-pipes discharge at points sufficiently remote from the outlet-pipe, so that the water admitted into the pan will not be immediately discharged. The outer end of the inlet-pipe is turned up, so that a funnel may be readily placed therein, and the water can thus be poured into the funnel without waste or overflow. The seat D is adapted to be fitted within the pan, and it has a depending flange $d$, which fits snugly in the vertical annular wall or side of the pan, an outwardly-projecting flange $d'$ being provided on the seat to rest upon the side of the pan. This seat is inclined, as at E, and is shaped to conform, as far as possible, to the person of the bather, and the inner depending wall $e$ of the seat extends downward from the lower edge of the inclined portion E, so that its lower edge will rest upon the bottom of the pan when the seat is arranged in place. This inner wall $e$ divides the pan into two compartments, one of which is formed between the wall $e$ of the seat and the wall of the pan, and the other compartment is formed between and within the wall of the seat. The hot water is admitted into the space between the side of the pan and the wall $e$, where it is neutralized by the water therein before coming in contact with the bather, who sits on the seat and in the water within the wall $e$ of said seat. The bath forms a safe and convenient means for bathing a limited portion of the body and is especially useful in diseases of the anus and rectum, not exposing the person to too much heat and lessening the liability of taking cold after the bath. The bath can be placed on a stool, chair, or other convenient place to suit the height of the bather, thereby adding much to the medical benefits of the hot water as well as the comfort of the bather.

The pan can be easily cleansed by removing the seat and drying the inside of said pan with a cloth, &c., and the overflow-tube prevents the water from spilling, and at the same time permits the water to cover the desired surface of the buttocks of the bather.

The sitz-bath may be readily adapted for use as a douche by attaching the cover F thereto. This cover has a flange $f$ around its curved edge, and it can be readily slipped over the flange $d'$ on the seat to form a cover for a portion of the pan, upon which the bather may sit and perform the necessary ablutions. It will be observed that the cover F is concaved to form an easy seat and permit any water which may splash thereon to run back into the pan, and the flange $f$ adapts the cover to be quickly fitted and held in place on the seat D and removed therefrom. This douche-bath may be used in or outside of the bed, and by removing the stopper or plug $c'$ the water will run out. This douche-pan has all the conveniences of a bed-pan, and by closing the overflow-pipe and filling the pan partly with antiseptic water it makes a perfect bed-pan, the parts of which can be readily cleansed.

I am aware that this improved sitz-bath and pan may be used for various other purposes and that changes in the form and proportion of parts and details of construction can be made without departing from the spirit or sacrificing the advantages of my invention, and I therefore reserve the right to make such changes and modifications as fairly fall within the scope of the same.

Having thus fully described my invention, what I claim as new, and desire to secure by Letters Patent, is—

1. The herein-described sitz-bath, comprising a pan having inlet and outlet pipes and a removable seat adapted to fit in said pan and having the inner depending wall adapted to rest upon the bottom of the pan and divide the same into two compartments, substantially as described.

2. The herein-described sitz-bath, comprising a pan, a removable inclined seat adapted to fit within said pan and divide the same into two compartments, and outlet and inlet pipes communicating with the outer compartment, substantially as described.

3. The herein-described sitz-bath, comprising a pan, a removable seat adapted to fit snugly in said pan and having the inner depending wall arranged to rest upon the bottom of the pan and divide the same into two compartments, the outlet-pipe, and the inlet-pipe having the branches to discharge the water on opposite sides of the pan in the outer compartment thereof, substantially as described.

4. In a sitz-bath, the combination, with a pan and a removable seat adapted to fit in the pan and divide the same into two concentric compartments, of an inlet-pipe having curved branches arranged in the outer compartment and an outlet-pipe communicating with the outer compartment and provided within said compartment with an upwardly-extending branch, substantially as described.

5. In a sitz-bath, the combination, with a pan and a seat adapted to fit therein, the inner wall of said seat dividing the pan into two compartments, of the inlet-pipe passing through the side of the pan and having the curved branches on the inner end thereof concentric with the side of said pan and adapted to discharge the water on opposite sides of the pan, the outlet-pipe arranged beneath said inlet-pipe and opening into the pan close to the bottom of the pan and provided with the upward extension arranged within the pan between the side thereof and the end of said pipe to receive the overflow of water in the pan, substantially as described.

6. The combination, with a pan having the inlet and outlet pipes, of a seat having an annular depending flange adapted to fit snugly within the side of the pan, the inclined portion of said seat conforming to the shape of the bather and the inner wall extending downward from the inner edge of said inclined portion to rest upon the bottom of the pan, substantially as described.

7. In a sitz-bath, the combination, with a pan, of a removable seat E, adapted to fit snugly within the pan and divide the same into two compartments, and a removable cover F, arranged to fit on the seat and partially cover the same and the pan, substantially as described.

8. The combination, with a pan having inlet and outlet pipes, of a seat adapted to fit snugly in said pan and having an annular flange around the upper edge thereof and a removable cover having a flange arranged to fit under said annular flange on the seat to hold said cover in place over a portion of the pan, substantially as described.

In testimony whereof I affix my signature in presence of two witnesses.

ALCINOUS B. JAMISON.

Witnesses:
CHARLES H. HAYNES,
MYRON T. PRITCHARD.